Inventors
Robert N. Eck
Walter A. Gossfeld
Robert E. Monigal
William C. Swanson
By Wm. A. Autio
Attorney

United States Patent Office 3,548,399
Patented Dec. 15, 1970

3,548,399
CONTACT-MONITORING FAULT INDICATORS
Robert E. Monigal, Milwaukee, Robert N. Eck, Whitefish Bay, Walter A. Gossfeld, Hubertus, and William C. Swanson, Milwaukee, Wis., assignors to Cutler-Hammer, Inc., Milwaukee, Wis., a corporation of Delaware
Filed Oct. 18, 1967, Ser. No. 676,321
Int. Cl. G08b 21/00
U.S. Cl. 340—253                    4 Claims

ABSTRACT OF THE DISCLOSURE

A fault finder for monitoring electrical circuits having a lamp circuit providing a visual indication of the opening of a contact due to a fault in the electrical system. The monitored contact which may be either in an A.C. or a D.C. energized system, upon opening, causes firing of a semiconductor element which lights a lamp, the lamp remaining lit until a reset switch is pressed. A first version thereof draws signaling power from the monitored system and indicates only the first-to-open of a series of monitored contacts. A second version supplies its own signaling power and indicates each contact that opens in a series of monitored contacts without regard to which one opened first.

BACKGROUND OF THE INVENTION

This invention relates to fault indicator circuits for electrical systems and more particularly to lamp-operating circuits for indicating the opening of one or more contacts in electrical systems. Fault indicators for indicating the opening of electrical contacts have been known heretofore. While these prior art fault indicators have been suitable and useful for their intended purposes, all of them have had certain characteristics which could be improved upon in the interest of simplicity of construction, wider application to different types of monitoring functions, effectiveness and reliability of operation, lower costs and smaller size and the like.

Prior art fault indicators of the direct monitoring type, that is, those connectable directly to the contact or switch being monitored, have been substantially restricted to D.C. circuits. But this does not mean that A.C. fault indicators or annunciators of faults in A.C. systems have not been available. However, for monitoring faults in A.C. systems, it has been the usual practice to use auxiliary contacts not energized by the A.C. supply for operating the fault indicators or annunciators. For example, in a three-phase circuit, the power contactor would be provided with an auxiliary contact, in addition to the three contacts that close the power circuit, for operating the annunciator, it being assumed that if a fault causes restoration of the contactor, the auxiliary contact also opens. This auxiliary contact would not carry any A.C., so that the annunciator could actually be of the D.C. contact monitoring type.

SUMMARY OF THE INVENTION

This invention relates to contact monitoring fault indicators which are applicable to both alternating current and direct current systems. In each modification, a gate-controlled solid state element is provided with supply voltage from a commercial A.C. rectified source and controls a lamp to indicate opening of a contact in the monitored system which may be of either A.C. or D.C. type. In a first modification, signaling power is drawn from the monitored system and only the first-to-open contact of a series of monitored contacts is indicated. In a second modification, the indicator circuit supplies its own signaling power and all open contacts that are being monitored will be indicated without any regard to which one opened first.

An object of the invention is to provide improved contact-monitoring fault indicators.

A more specific object of the invention is to provide improved fault indicators capable of monitoring either A.C. or D.C. systems.

Another specific object of the invention is to provide an improved fault indicator device having a memory function such that a fault having occurred continues to be indicated until the device is manually reset.

Another specific object of the invention is to provide improved fault indicator circuits that are simple in construction, have wider application to different types of monitoring functions, are effective and reliable in operation, and are of smaller size and more economical to manufacture.

Other objects and advantages of the invention will hereinafter appear.

BRIEF DESCRIPTION OF THE DRAWINGS

These and other objects and advantages of the invention and the manner of obtaining them will best be understood by reference to the following description of preferred embodiments of contact-monitoring fault indicators taken in conjunction with the accompanying drawings, wherein.

DESCRIPTION OF THE PREFERRED EMBODIMENTS

Figure 1:
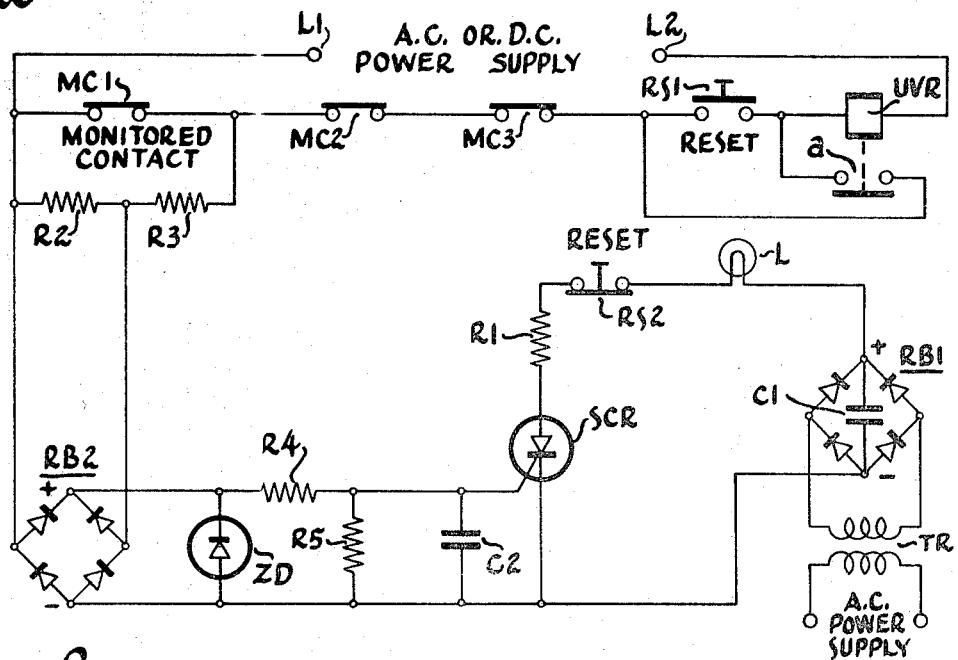
FIG. 1 is a circuit diagram of a fault-indicator constructed in accordance with the invention to provide an indication of the first-to-open of a series of monitored contacts.

Referring to FIG. 1, there is shown a contact-monitoring fault indicator of the type which indicates only the first contact that opens in a plurality of monitored contacts connected in a series circuit. That is, in a series circuit having more than one contact, each one of which is being monitored by a fault indicator, the first contact that opens operates the fault indicator connected thereto and effectively disables the series circuit so that the remaining fault indicators will not operate although the contacts associated therewith might open. Thus, the operated fault indicator not only indicates the fault but also indicates at which contact the fault occurred first.

At the upper portion of FIG. 1, there is shown an electric circuit having contacts which are to be monitored. While such electric circuit may take various forms, for exemplary purposes, it is illustrated as an undervoltage relay circuit. This circuit includes an operating coil UVR of an undervoltage relay connected in series with a reset switch RS1 and a plurality of monitored contacts MC1, MC2 and MC3 across lines L1 and L2 which are adapted to be connected to an electrical power supply. As depicted in FIG. 1, this power source which supplies the undervoltage relay circuit may be of either type, alternating current or direct current. In addition to the usual contacts that an undervoltage relay is provided with to connect power to an electrical system or the like, not shown, the undervoltage relay is provided with an additional normally-open contact *a* shown in FIG. 1 connected across reset switch RS1. As will be apparent, the purpose of this contact is to complete a self-maintaining circuit in shunt of the reset switch when the undervoltage relay is energized to permit release of the reset switch to allow it to reopen following momentary depression thereof.

The lower portion of FIG. 1 shows a fault indicator circuit connected across contact MC1. Since like fault indicator circuits would be connected across contacts MC2 and MC3, only the fault indicator circuit that monitors contact MC1 has been shown to avoid unnecessary duplication.

This fault indicator circuit comprises a visual indicator portion supplied from a unidirectional source such as an alternating current rectified and smoothed source under the control of a gating type solid state element and a control or input signal portion for the solid state element supplied from the undervoltage relay circuit under the control of the monitored contact. As will readily be apparent, the visual indicator portion is shown at the lower right portion of FIG. 1 and the input signal portion is shown at the lower left portion of FIG. 1.

The visual indicator portion of the circuit comprises a controllable solid state element such as a semiconductor controlled rectifier SCR having a main current conduction path including an anode and a cathode and a control current conduction path including a gate and the aforementioned cathode. The anode is connected through a current limiting resistor R1 of 2.5 kilohm or the like, a normally closed reset switch RS2 and an indicator lamp L in series to the positive output terminal of a rectifier bridge RB1 while the cathode is connected directly to the negative output terminal of the rectifier bridge. An alternating current power source is adapted to be connected through an isolating transformer TR to the input terminals of rectifier bridge RB1. A smoothing capacitor C1 is connected across the output terminals of rectifier bridge RB1 so that a substantially constant and continuous unidirectional supply voltage is applied to the circuit including the lamp, reset switch, resistor R1 and SCR. While a semiconductor controlled rectifier SCR has been shown herein as a preferred element, it will be apparent that other equivalent elements might be used in place thereof within the scope of this invention. Also, the lamp might be connected in parallel with the anode-cathode path of element SCR so that it will normally be lit and will go out when a fault occurs.

The input signal portion of the circuit shown in FIG. 1 comprises a voltage divider having resistors R2 and R3 connected in series across contact MC1. A rectifier bridge RB2 has its input terminals connected across resistor R2 and has its positive output terminal connected through a current limiting resistor R4 of 500 ohms or the like to the gate of semiconductor controlled rectifier SCR. The negative output terminal of rectifier bridge RB2 is connected directly to the cathode of the semiconductor controlled rectifier. A Zener diode ZD is connected across the output terminals of rectifier bridge RB2 to limit the voltage applicable from rectifier bridge RB2 to the gate of the semiconductor controlled rectifier. A resistor R5 of 47 ohms or the like and a capacitor C2 are connected in parallel between the gate and cathode of the semiconductor controlled rectifier to control the gate so that the semiconductor element will operate only on a single and will not operate inadvertently. For this purpose, capacitor C2 will absorb any voltage spikes caused by disturbances in the undervoltage relay circuit and thereby prevent the semiconductor element from responding to unwanted transients in the monitored circuit. Resistor R5 discharges capacitor C2 between input signals and if a series of closely spaced unwanted transients should occur, leaks off enough current from capacitor C2 to prevent the voltage thereon from building up to a high enough value where it might fire the semiconductor element.

The operation of the fault indicator circuit of FIG. 1 will now be described with the assumption that after the undervoltage relay has been energized a fault in the system, such as for example, an overload current or the like, causes opening of contact MC1.

It will be apparent that when A.C. or D.C. power has been connected to lines L1 and L2 and reset switch RS1 has been pressed, the operating coil of undervoltage relay NVR energizes in a circuit extending through monitored contacts MC1, MC2 and MC3 in series. In addition to its usual operating contacts, the undervoltage relay closes its contact *a* to complete a self-maintaining circuit in shunt of the reset switch whereafter the latter may be released to allow it to reopen.

The circuit is now in its monitoring condition and if a fault causes opening of contact MC1, a pulse of current is applied through voltage divider resistor R2 and R3. The insertion of these resistors, which have relatively large values such as four and five kilohms, respectively, or the like, in series with the operating coil of the undervoltage relay causes deenergization of the latter and reopening of its contact *a*. Relay UVR also restores its other contacts to disconnect power from the circuit it was controlling in the usual manner. This pulse of either alternating or direct current depending upon which was being used in the circuit of relay UVR causes a proportional voltage to appear across resistor R2. As a result, current flows through rectifier bridge RB2 and resistor R4 into the gate of semiconductor element SCR. The voltage appearing at the gate is positive relative to the cathode due to the full wave rectification at bridge RB2. Therefore, the polarity of the connection of the voltage divider R2–R3 across contact MC1 is not important and the connection may be made in either way.

This pulse of current flowing into the gate of the semiconductor element fires the latter into conduction to afford a visual indication of the fault. To this end, current flows from the positive terminal of rectifier bridge RB1 through lamp L, reset switch RS2, resistor R1 and the anode-cathode circuit of element SCR to the negative terminal of bridge RB1. As a result, the lamp lights to indicate that a fault has occurred.

As will be apparent, D.C. supply voltage for the lamp circuit is provided from an A.C. power supply through transformer TR and rectifier bridge RB1. Capacitor C1 smooths the full-wave rectified voltage so that substantially constant cointinuous unidirectional voltage is applied to element SCR. Consequently, element SCR remains conducting after the pulse at its gate has terminated. This provides a memory function whereby the indication continues once it has been initiated until switch RS2 is momentarily pressed to restore element SCR to its nonconducting condition.

The input signal portion of the circuit is provided with elements to enhance the reliability of operation. A Zener diode ZD may be connected across the output terminals of rectifier bridge RB2 to limit the voltage applicable to the gate of element SCR in the event of disturbances in the undervoltage relay circuit. If a high voltage should occur, Zener diode ZD passes an avalanche of current to limit the bridge output, as for example, to eight volts or the like. Capacitor C2 is connected between the gate and cathode to absorb transient voltage spikes that might occur and hereby prevent firing of element SCR except when an input signal arrives. Resistor R5 across this capacitor discharges the latter and also leaks off enough current therefrom so that even a closely-spaced series of unwanted voltage spikes will not cause the capacitor to build up to a firing value.

It will be apparent that although a fault indicator circuit like that shown may be connected across each monitored contact MC1 to MC3, only the first-to-open contact will be indicated. This is due to the fact that the input signal power is taken from the monitored circuit. Therefore, since he first contact to open drops out the undervoltage relay, the power has been disconnected from the remaining monitored contacts so that the fault indicators connected thereacross cannot be operated. Even if a second monitored contact opens so soon after the first one that the undervoltage relay has not yet had time to disconnect power at its contact a, insertion of the rather high resistance of the voltage divider into the circuit by the first-to-open contact is enough to prevent operation of a second fault indicator.

Figure 2:
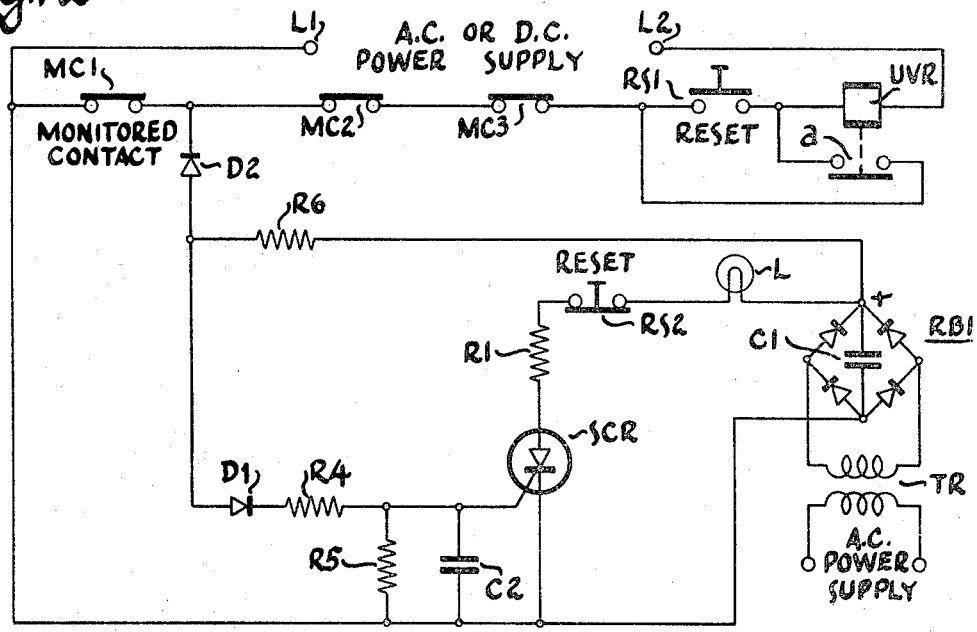
FIG. 2 is a circuit diagram of a modification of the fault indicator of FIG. 1 for indicating each contact that opens in a series of monitored contacts.

Whereas the FIG. 1 circuit indicates only the first opening contact, the FIG. 2 circuit indicates all the contacts that open without regard to the order in which they opened. In FIG. 2, reference characers like those in FIG. 1 have been used for like-positioned elements. The circuit in FIG. 2 differs from that in FIG. 1 in the input signal portion and in the value of resistor R1. Certain elements present in FIG. 1 have been omitted such as voltage divider R2-R3, rectifier bridge RB2 and Zener diode ZD. Certain other elements have been put in place thereof in FIG. 2 such as unidirectionally conducting diodes D1 and D2 and resistor R6 and their connections.

As shown in FIG. 2, rather than taking input signal power from the monitored circuit as in FIG. 1, this input signal power is provided from the positive terminal of rectifier bridge RB1 through current limiting resistor R6 of 3.5 kilohms or the like, unidirectional diode D1 in its forward low impedance direction and resistor R4 of 27 ohms or the like to the gate of element SCR. This input power would immediately fire element SCR were it not for the fact that the input circuit of element SCR is shunted by the monitored contact. This shunt circuit exends from the junction between resistor R6 and diode D1 through unidirectional diode D2 in its forward low impedance direction and contact MC1 to the cathode of element SCR. This immediately reveals that whereas in FIG. 1 the indicator circuit was operated by a pulse supplied from the monitored circuit, in FIG. 2 the monitored contact merely unshunts self-provided input voltage.

In FIG. 2 when contact MC1 is in closed condition, current flows from the positive terminal of rectifier bridge RB1 through resistor R6, diode D2 and contact MC1 to the negative terminal of the rectifier bridge. The forward voltage across diode D2 is so small that it effectively shunts the input circuit of element SCR and no significant voltage appears between the gate and cathode thereof. Consequently, the semiconductor element cannot be fired into conduction as long as contact MC1 remains closed.

Resistor R5 having a value of 100 ohms or the like provides a discharge path for capacitor C2 to enable the latter to absorb voltage spikes as hereinbefore described in connection with FIG. 1.

Opening of contact MC1 causes lighting of lamp L to indicate a fault. To this end, contact MC1 interrupts the shunt across the input to the semiconductor element. As a result, current now flows from the positive terminal of bridge RB1 through resistor R6, diode D1 forwardly and resistor R4 to the gate of element SCR to fire the latter into conduction. The path for this current is completed from the cathode to the negative terminal of the bridge. Current then also flows from the positive terminal of the bridge through lamp L, reset switch RS2, resistor R1 of one kilohm or the like and the anode and cathode of element SCR to the negative terminal of the rectifier bridge to light the lamp as an indication of the fault condition in the system. This lamp stays lit until reset switch RS1 is momentarily depressed to interrupt anode voltage from element SCR, assuming of course, that the fault has been cleared and contact MC1 has been reclosed. Otherwise, the lamp will immediately light again.

From the foregoing, it will be apparent that since the fault indicator of FIG. 2 draws no input signal power from the undervoltage circuit being monitored, all contacts that open will be indicated by their respective fault indicator circuits. If more than one lamp has lit, it will not be possible to determine which contact opened first.

This fault indicator circuit shown in FIG. 2 will indicate faults on either A.C. or D.C. monitored systems. However, when used on D.C. monitored circuits, the fault indicator circuit should be connected across the monitored contact in the proper polarity. As shown in FIG. 2, diode D2 should be connected to the positive voltage side of contact MC1 as depicted by the plus sign. This will prevent application of unnecessary voltages and currents which might be damaging to the fault indicator circuit.

In the arrangement as shown in FIG. 2, diode D1 blocks reverse current flow in the cathode-gate circuit of element SCR from the line L1-L2 power supply especially if the latter is an A.C. power supply. Diode D2 blocks current flow from the monitored circuit power supply to the gate of element SCR. This blocking action is necessary because the fault indicator circuit supplies its own input signal power and the current from the undervoltage relay circuit unless blocked might be damaging to the elements in the fault indicator circuit.

While the apparatus hereinbefore described is effectively adapted to fulfill the objects stated, it is to be understood that the invention is not intended to be confined to the particular preferred embodiments of contact-monitoring fault indicators disclosed, inasmuch as they are susceptible of various modifications without unduly departing from the scope of the appended claims.

We claim:

1. A fault indicator system capable of monitoring a circuit closing device which may be connected in either an alternating current or direct current energized circuit and indicating abnormal tripping of such device into its circuit open condition comprising:
    an electrically operable indicator device;
    a gating type control element having a pair of main conduction electrodes and a control electrode and being operable when a pulse on the control electrode fires it into conduction of sustaining conduction in response to a potential on the main conduction electrodes;
    a unidirectional voltage source and means connecting said indicator device and the main electrodes of said control element to said source to be supplied thereby;
    a control circuit comprising unidirectional current conduction means which allows current flow in only one direction in at least a portion thereof;
    means connecting said control circuit to the circuit closing device being monitored to respond to an open circuit condition thereof;
    means connecting the unidirectional current conduction portion of said control circuit to the control electrode and one of the main electrodes of said control element;
    and means in said control circuit including said unidirectional current conduction portion thereof responsive to tripping of the circuit closing device into open conduction for applying a direct current pulse to said control electrode to fire said control element into conduction thereby to energize said indicator device and to sustain said conduction as a memory of the fault regardless of whether the circuit closing device appears in an alternating current or direct current energized circuit, said means in said control circuit comprising:
        impedance means normally shunted by the circuit closing device being monitored and being rendered effective when the circuit closing device trips open to pass current from the monitored circuit through said unidirectional current conduction means to the control electrode of said control element;
        said impedance means comprising:
            a voltage divider connected across the circuit closing device being monitored so that current from the monitored circuit flows in said voltage divider when the circuit closing device opens;

and said unidirectional current conduction means comprises a rectifier bridge connected across a portion of said voltage divider for providing a rectified pulse to said control electrode.

2. A fault indicator system capable of monitoring a circuit closing device which may be connected in either an alternating current or direct current energized circuit and indicating abnormal tripping of such device into its circuit open condition comprising:

an electrically operable indicator device;

a gating type control element having a pair of main conduction electrodes and a control electrode and being operable when a pulse on the control electrode fires it into conduction of sustaining conduction in response to a potential on the main conduction electrodes;

a unidirectional voltage source and means connecting said indicator device and the main electrodes of said control element to said source to be supplied thereby;

a control circuit comprising unidirectional current conduction means which allows current flow in only one direction in at least a portion thereof;

means connecting said control circuit to the circuit closing device being monitored to respond to an open circuit condition thereof;

means connecting the unidirectional current conduction portion of said control circuit to the control electrode and one of the main electrodes of said control element;

and means in said control circuit including said unidirectional current conduction portion thereof responsive to tripping of the circuit closing device into open conduction for applying a direct current pulse to said control electrode to fire said control element into conduction thereby to energize said indicator device and to sustain said conduction as a memory of the fault regardless of whether the circuit closing device appears in an alternating current or direct current energized circuit, said means in said control circuit comprising:

impedance means normally shunted by the circuit closing device being monitored and being rendered effective when the circuit closing device trips open to pass current from the monitored circuit through said unidirectional current conduction means to the control electrode of said control element;

said impedance means comprising:

a total impedance value sufficiently large to allow operation of only one fault indicator system in the event a plurality of circuit closing devices in series connection are being monitored by respective fault indicator systems thereby to indicate the first fault that occurs.

3. A fault indicator system capable of monitoring a circuit closing device which may be connected in either an alternating current or direct current energized circuit and indicating abnormal tripping of such device into its circuit open condition comprising:

an electrically operable indicator device;

a gating type control element having a pair of main conduction electrodes and a control electrode and being operable when a pulse on the control electrode fires it into conduction of sustaining conduction in response to a potential on the main conduction electrodes;

a unidirectional voltage source and means connecting said indicator device and the main electrodes of said control element to said source to be supplied thereby;

a control circuit comprising unidirectional current conduction means which allows current flow in only one direction in at least a portion thereof;

means connecting said control circuit to the circuit closing device being monitored to respond to an open circuit condition thereof;

means connecting the unidirectional current conduction portion of said control circuit to the control electrode and one of the main electrodes of said control element;

and means in said control circuit including said unidirectional current conduction portion thereof responsive to tripping of the circuit closing device into open condition for applying a direct current pulse to said control electrode to fire said control element into conduction thereby to energize said indicator device and to sustain said conduction as a memory of the fault regardless of whether the circuit closing device appears in an alternating current or direct current energized circuit, said means in said control circuit comprising:

means for supplying a firing pulse to said control electrode independently of the monitored circuit energizing source and being rendered effective in response to the circuit closing device tripping open whereby a plurality of series connected circuit closing devices may be monitored by respective fault indicator systems to indicate all existing faults.

4. A fault indicator system capable of monitoring a circuit closing device which may be connected in either an alternating current or direct current energized circuit and indicating abnormal tripping of such device into its circuit open condition comprising:

an electrically operable indicator device;

a gating type control element having a pair of main conduction electrodes and a control electrode and being operable when a pulse on the control electrode fires it into conduction of sustaining conduction in response to a potential on the main conduction electrodes;

a unidirectional voltage source and means connecting said indicator device and the main electrodes of said control element to said source to be supplied thereby;

a control circuit comprising unidirectional current conduction means which allows current flow in only one direction in at least a portion thereof;

means connecting said control circuit to the circuit closing device being monitored to respond to an open circuit condition thereof;

means connecting the unidirectional current conduction portion of said control circuit to the control electrode and one of the main electrodes of said control element;

and means in said control circuit including said unidirectional current conduction portion thereof responsive to tripping of the circuit closing device into open condition for applying a direct current pulse to said control electrode to fire said control element into conduction thereby to energize said indicator device and to sustain said conduction as a memory of the fault regardless of whether the circuit closing device appears in an alternating current or direct current energized circuit;

said means in said control circuit comprising:

means connecting the unidirectional current conduction portion of said control circuit to said unidirectional voltage source to be supplied therefrom;

and a shunt circuit extending through the monitored circuit closing device for diverting current away from the control electrode and for causing current flow to said control electrode through said unidirectional portion of said control circuit when the circuit closing device trips open.

(References on following page)

References Cited

UNITED STATES PATENTS

| | | | |
|---|---|---|---|
| 3,011,162 | 11/1961 | Byrnes | 340—248 |
| 3,021,515 | 2/1962 | Christan et al. | 340—253C |
| 3,171,112 | 2/1965 | Martin | 340—253 |
| 3,179,930 | 4/1965 | Pell | 340—213 |
| 3,243,796 | 3/1966 | Harmon et al. | 340—253B |
| 3,277,460 | 10/1966 | Heckman | 340—253 |
| 3,428,943 | 2/1969 | Carp et al. | 340—251 |
| 2,719,966 | 10/1955 | Schurr | 340—415UX |

DONALD J. YUSKO, Primary Examiner

D. MYER, Assistant Examiner

U.S. Cl. X.R.

340—213.1, 415